United States Patent [19]
Lopez Sanchez

[11] 3,951,690
[45] Apr. 20, 1976

[54] BASE FOR LEAKPROOF ELECTROCHEMICAL CELLS AND METHOD OF FORMING THE SAME

[75] Inventor: Demetrio Lopez Sanchez, Madrid, Spain

[73] Assignee: Pilas Secas Juipter S.A., Tolosa, Spain

[22] Filed: Aug. 1, 1974

[21] Appl. No.: 493,883

Related U.S. Application Data
[63] Continuation-in-part of Ser. No. 262,467, June 14, 1972, abandoned.

[30] Foreign Application Priority Data
Aug. 5, 1971 Spain .................... 171,501

[52] U.S. Cl. ........................... 136/133; 136/175
[51] Int. Cl.² ................................. H01M 2/04
[58] Field of Search ................ 136/176, 133, 175

[56] References Cited
UNITED STATES PATENTS

| | | | |
|---|---|---|---|
| 2,346,640 | 4/1944 | Anthony | 136/133 |
| 3,501,351 | 3/1970 | Karobath | 136/133 |
| 3,823,039 | 7/1974 | Sanchez | 136/133 |

FOREIGN PATENTS OR APPLICATIONS

| | | | |
|---|---|---|---|
| 1,445,913 | 12/1966 | France | 136/133 |

Primary Examiner—Donald L. Walton
Attorney, Agent, or Firm—Wenderoth, Lind & Ponack

[57] ABSTRACT

A method and device for providing leak-proof sealing of dry electrochemical cells allowing excellent tightness to be obtained. Onto the bottom of a metallic cup-shaped negative electrode of the cell is fitted a dish having a central protrusion and apertures positioned in a peripheral zone outwardly of the protrusion. A hot thermoplastic material is then employed for blocking or sealing the apertures in the dish, thus creating a mass of the plastic material on both sides of the apertures. At the same time the mass is bonded to the thermoplastic casing, inside which the cup of the cell is enclosed. The material used for blocking the apertures may be injected from the outside, placed in advance in the dish prior to fitting the latter to the cup, or be provided by a part of the casing itself, which part extends for a sufficient length beyond the bottom of the cup. The cell sealed in this manner does not need to be encircled by a metallic ring. The cell bottom contains an electric contact formed by the protrusion of the dish. The remainder of the dish, covered with a plastic material, is uniformly joined with the casing.

12 Claims, 14 Drawing Figures

BASE FOR LEAKPROOF ELECTROCHEMICAL CELLS AND METHOD OF FORMING THE SAME

CROSS-REFERENCE TO RELATED APPLICATION

This application is a continuation-in-part application of copending U.S. Pat. application Ser. No. 262,467, filed June 14, 1972, now abandoned.

BACKGROUND OF THE INVENTION

The present invention relates to an improvement in the sealing of leak-proof electrochemical cells, particularly concerning the sealing of the cell bottom. The invention relates to a method of achieving this closing, as well as to cells obtained by this method.

The leak-proof closing of electrochemical cells poses difficult problems, mostly due to corrosion and the formation of gaseous pressure inside the cell while it is working. Generally speaking, the positive electrode, electrolyte and depolarizer mass are enclosed in a metallic cup, most often of zinc, magnesium, or some other metal which fulfils the role of a negative electrode; as the bottom of such a cup constitutes the negative terminal of the cell, special precautions should be taken to establish a satisfactory electrical contact between this bottom and the exterior, at the same time ensuring that there is perfect tightness and that suitable mechanical solidity between the bottom and the exterior exists. To solve this problem, the method used consists in fixing a suitably sealed metallic part against the outside surface of the bottom of the negative electrode. The role of this metallic part is to ensure electric contact between the cup and the exterior, and at the same time to mechanically protect the bottom of the cell. The problem still existing is to establish the required tightness between the above-mentioned metallic part and the remainder of the cell. Plastic material is usually used for interposition and/or partial envelopment, but this problem, which appears to be simple, is in fact quite difficult to solve with acceptable economic means. The joint between the metallic part and the whole of the cell is the delicate point. To accomplish this joint, attempts have been made to hold the metallic part in place by a plastic casing which surrounds the cup of the cell. However, it is then necessary for this plastic casing to be compressed by an external metallic sleeve, as described in U.S. Pat. No. 2,802,042, to Anthony et al. As this system has not given satisfaction, the metallic part has been given a dish shape, the cylindrical side-walls of which are fitted onto constricted walls of the part of the cup adjacent to the bottom thereof. The constriction is such that the outer diameter of the dish so fitted is equal to the diameter of the remaining part of the cup, in such a way that there is no protrusion at dish level on the plastic casing which encloses the whole. Such an arrangement is described in U.S. Pat. No. 3,168,420 and 3,433,681 to Jammet. As such fitting onto the constrained part is not sufficient to ensure that the metallic dish be held tight and sealed, the patents to Jammet provided for compression of the whole by a metallic ring tightening the plastic casing. This ring, by means of the plastic casing, compresses the side-walls of the dish against the constricted parts of the cup. This system involves some rather exacting operations as far as the manufacture of the cell is concerned, because it is first of all necessary to grip the bottom of the cup, position the dish, cut the edges which protrude downwardly from the plastic casing, then fit the metallic ring onto the whole and, finally, to compress it into a mould to reduce its diameter in order to obtain the required compression. Manufacture therefore comprises 4 or 5 additional operations from the moment when the cup is charged with the components of the cell and covered with its plastic casing.

Another solution to this problem is described in U.S. Pat. No. 3,501,351 to Karobath. Instead of a dish, there is used a metallic part having a diameter equal to or smaller than the bottom of the negative electrode. This part has perforated apertures to allow the passage of a plastic material. To fix this part, first of all the bottom of the cup is lined with a plastic material, then the part is pressed against the bottom of the cell to embed it into the plastic material fixed to the bottom. The periphery of the plastic casing surrounding the cell is then bonded to the material which covers the part. Due to the apertures, the plastic material is well anchored to the metallic part, on both sides of the apertures, to improve the seal. However, the manufacture of cells by this method requires at least three additional operations, and fixing by embedding the metallic part is not altogether satisfactory.

SUMMARY OF THE INVENTION

The present invention allows the shortcomings of the prior art to be remedied and to obtain cells very well sealed, more economically produced, by a reduced number of operations. This invention surprisingly makes it possible to obtain these improved results by a new arrangement of certain means of prior art.

One of the objects of the invention is to provide a method of sealing the bottom of the cell by means of a perforated metallic dish, fitted onto the lower part of the cell cup, this being achieved by passing plastic material through the apertures provided in the dish, while simultaneously bonding this material to the plastic casing surrounding the cup.

Another object of the invention consists in the above indicated method in which no metallic ring is used for pressing the plastic casing and the side-walls of the dish, and neither the perforated dish, nor the bottom of the cup are coated in advance with plastic material. Indeed, the invention is based on an unexpected fact, namely that the strength of the dish may be ensured without the need for any additional ring compressing it against the cup if, instead of covering the bottom of the cup with a plastic material and then embedding the perforated part into this material, the dish is first mounted onto the bottom of the cup and the plastic material when hot is passed through the apertures provided in the dish, thus filling them up and forming a deposit of the plastic material on both sides of these apertures. It is important for this operation to be carried out in such a way that bonding of the plastic material, which fills up the above-mentioned apertures, to the plastic casing surrounding the cup, is produced at the same time.

One of the objects of the invention is therefore an operation comprising no more than two stages, contrary to prior art processes. Namely, after having charged the interior of the cup, the cup is covered with a casing of plastic material at the same time as the final sealing of the cell is carried out.

Another object of the invention consists in using thermoplastic material preferable of the polyolefine (polyalkene) or polyamide type, and particularly polyethylene for filling up the apertures in the dish fitted onto the bottom of the cup, and the same plastic material, or material suitable for making a good bond therewith for making the outer casing covering the cup.

Another object of the invention is the use of a metal such as steel, iron, brass, etc., for the dish, and more particularly galvanised or tinned steel, the thickness of the cylindrical side-walls of the dish being approximately 0.05 to 0.4 mm, the height of these side-walls having a value of between approximately ½ and 1/10 of the dish diameter.

In general the cell according to the invention is an electrochemical leak-proof cell, the bottom of which, forming one of the cell electrodes, is sealed by the method according to the invention, as above described. In other words, the cell according to the invention comprises a bottom formed by the bottom of a metallic cup which is the negative electrode of the cell, a dish with relatively low cylindrical side-walls being fitted onto the lower part of the cup, and a plastic material cast enclosed in the space between the bottom of the dish and the bottom of the cup. The dish has a peripheral zone which is covered with the same plastic material by reason of apertures through the dish, and this peripheral zone of the plastic material is bonded to the plastic casing which covers the side-walls of the cup and of the dish.

The lower part of the cup, onto which the dish is fitted, may be shaped as a conical frustum having a low inclination angle, or may be slightly reduced in diameter so that the outside diameter of the part of the cup to be inserted into the dish is almost equal to the diameter of the dish. However, taking into account that, on one hand, the thickness of the cylindrical side-walls of the dish is very small, and on the other hand, the relative flexibility of the outer plastic casing, reduction of the diameter is therefore not absolutely necessary. Thus, in cells sealed according to the invention the cup may have a uniform diameter along its entire height, while the side-walls of the dish form, at the lower part of the side-walls of the cup, a very slight thickening which does not present any obstacle, and the circular protuberance of which is diminished by the plastic casing covering the whole.

BRIEF DESCRIPTION OF THE DRAWINGS

The invention will be better understood from the description which follows. In this description only the lower part of a leak-proof dry cell is considered which, as an example, is a cell of which the negative electrode is made of zinc. The construction of such cells is generally known in the art, for instance by the above cited U.S. patents. It is not necessary, therefore, to describe such a cell in detail, and only the closing of the lower part as modified according to the invention will be discussed below.

In the drawings,

FIG. 1b is a plan view of the dish shown in FIG. 1a.

DESCRIPTION OF THE PREFERRED EMBODIMENTS

Figure 1:
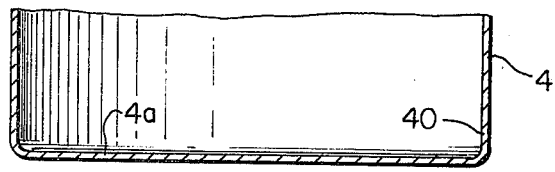
FIG. 1 is an axial sectional view of the lower part of the cup of a leak-proof dry cell, prior to fitting it into the dish according to the invention.
Figure 1A:
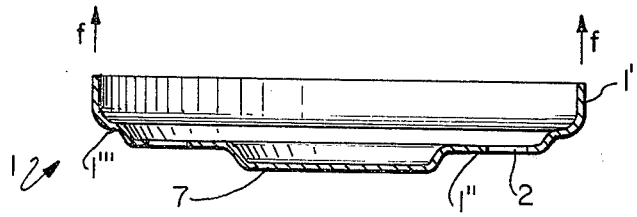
FIG. 1a is an axial section of a dish prepared for positioning onto the cup.

FIGS. 1 and 1a show schematically the first operation of sealing according to the method of the invention. The dish 1 is fitted or set onto the lower part 40 of the zinc cup 4. As shown on the drawing, the dish is pushed in the direction of the arrow $f$. The rim of the cylindrical side-walls 1' of the dish may be slightly chamfered in order to make easier the fitting operation onto the underside 40 of the cup 4. This operation is carried out very rapidly and easily, and is self-explanatory. The peripheral zone 1" of the horizontal bottom of dish 1 is perforated with a number of apertures 2, which are better seen in the plan view shown in FIG. 1b. The central zone of the bottom of the dish 1 has a downwardly or outwardly extending protrusion 7, the purpose of which is to provide a contact surface for the negative pole of the cell. An important characteristic of the dish 1 is the annular shoulder 1''' situated between the sidewall 1' and the peripheral area 1". The purpose of shoulder 1''' is to serve as a support or abutment for the dish on the bottom 4a of the cup. The height of the shoulder determines the depth of the gap 7', required according to the invention, between the apertures 2 of the dish 1 and the bottom 4a of the cup. The depth of the gap is usually between 0.5 to 5 mm but preferably 1 to 3 mm.

Figure 2:
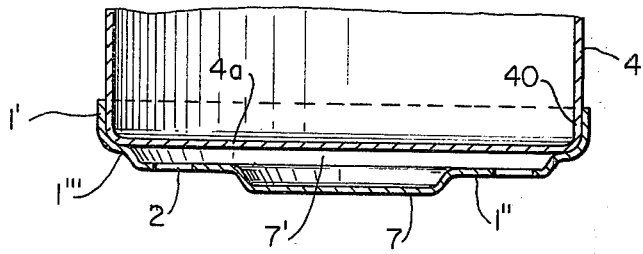
FIG. 2 shows, in axial section, an assembly of the dish with the cup, after the first stage of the operation according to the method of the invention.

FIG. 2 shows the lower part 40 of the cup onto which is fitted the dish 1. This type of fixing creates a double bottom, the inside empty space or gap 7' of which is limited by the bottom 4a of the cup 4, and the bottom-walls 1", 1''' and 7 of the dish 1.

Figure 3:
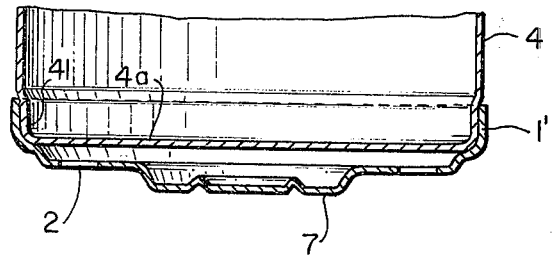
FIG. 3 shows, also as an axial section, the assembly of the dish with the cup, after the first stage of the operation, but in the case of an alternative embodiment in which the lower part of the cup is constricted.

FIG. 3 shows an arrangement similar to that shown in FIG. 2, but it corresponds to an alternative solution in which the bottom 41 of the side-wall of cup 4 is constricted and has a slightly reduced diameter, in such a way that the outside diameter of 1' is very close to the outside diameter of 4. This arrangement is useful when the cells are relatively large, and when the dish 1 has relatively thick side-walls. However, as generally the metal used for the dish is very thin, between 0.05 and 0.25 mm, and most often between 0.1 and 0.2 mm, it is not absolutely necessary to reduce the diameter of 41.

The protrusion 7 of the dish 1, as shown in FIG. 3, has a shape slightly different from that shown in FIG. 2. The particular shape of this protuberance is of no great importance, as long as this part has a surface sufficiently large to ensure good contact with an outside electric connection. As far as the electric contact between the dish 1 and the cup 4 is concerned, it is preferably ensured by the fitting of 1' on 41 covered in due course with a plastic casing. There is no risk of this contact being affected after the cell has been sealed.

Figure 4:
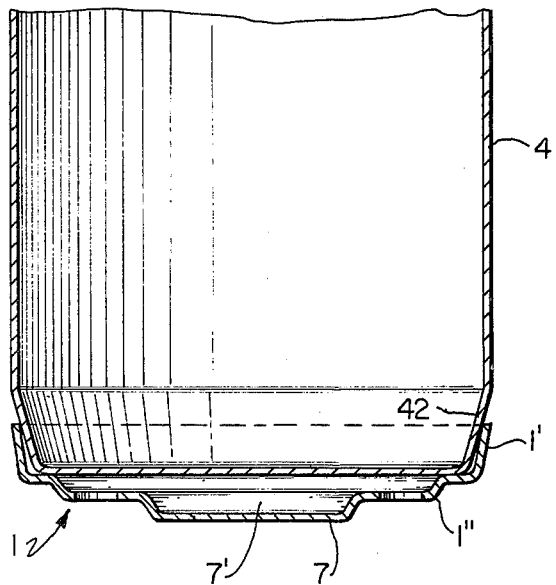
FIG. 4 shows a view analogous with those shown in FIGS. 2 and 3 but of another alternative embodiment in which the lower part of the cup has the form of a conical frustum with a low angle of inclination.

Another constructional design, shown in FIG. 4, is characterised by the bottom wall 42 of the cup 4 having the shape of a slight conical frustrum, and by the walls of the dish 1 correspondingly flaring outwardly. In this way the difference between the outside diameter of the dish 1 as fitted and the diameter of the cup 4 may be reduced to zero. The conical angle of inclination of the bottom wall 42 of the cup is preferably 60° to 80° in relation to the horizontal.

Figure 5:
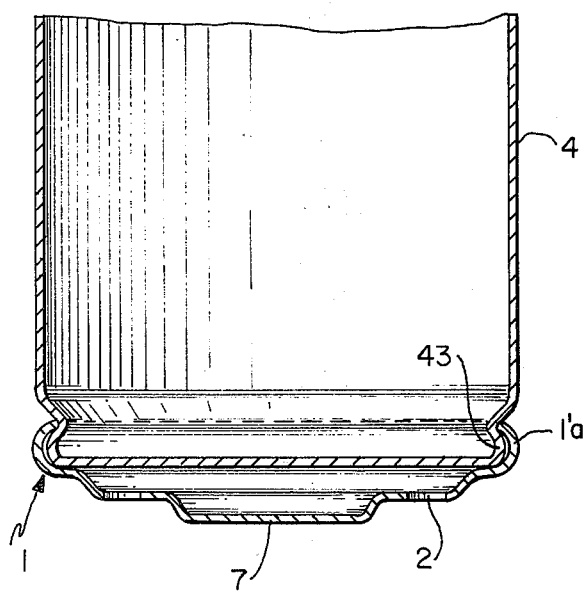
FIG. 5 is a view similar to those shown in FIGS. 2 to 4, but for a still further alternative embodiment in which the lower parts of the cup and of the dish have slightly protuberant walls.

FIG. 5 indicates another constructional embodiment in which the bottom wall 43 of the cup 4 is of slightly reduced diameter and is given a protuberant shape, while the corresponding side-wall 1'a of the dish 1 is given a corresponding shape, so as to provide a gripping effect on the wall 43. It is desirable to design the diameter of wall 1'a with respect to the diameter of wall 43 to ensure that the rim of the dish encloses the lower part of the cup by simple elasticity of the metal from which the dish is made.

According to the embodiment selected, it is possible, when dealing with not very large cells, particularly between 10 to 40 mm in diameter, to design the differences in diameter between the dish 1 and the cup so that such difference is between 0 and 0.5 mm. For instance, this difference does not exceed 0.4 mm, if the design adopted is as shown in FIG. 2; 0.2 mm for the design of FIG. 3; zero for FIG. 4 and 0.5 for the case shown in FIG. 5. It is obvious that the dimensions mentioned are only approximate, and are given simply as an illustration, as it is always possible to adjust or modify the thickness of the metallic wall forming the dish 1, and possibly the depth of the constricted diameter part or the cone angle of the bottom of the cup. Whatever the differences in the diameter, even up to 0.5 mm, these differences do not present any obstacle to the use of the cell.

Figure 1B:
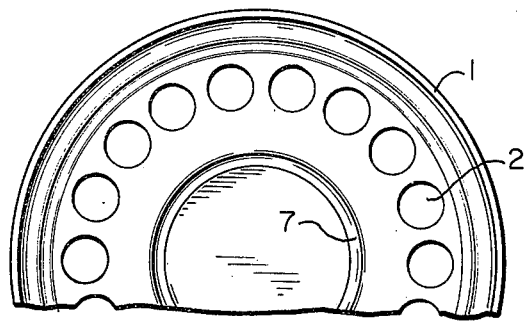

The perforations 2, made in the horizontal bottom wall of the dish, may have a variety of shapes and do not necessarily need to have a circular form as shown in FIG. 1b, which is just an illustration. The number and the total area of the apertures are not critical but it is obvious that their dimensions must be such as to ensure that the mechanical strength of the bottom of the dish is not affected. It is therefore preferable that the total area of these perforations comprises between ½ and ¾, or preferably between ⅓ and ⅔, of the surface of the horizontal peripheral zone of the dish 1'', i.e., the horizontal part excluding the protrusion 7.

Figure 6A:
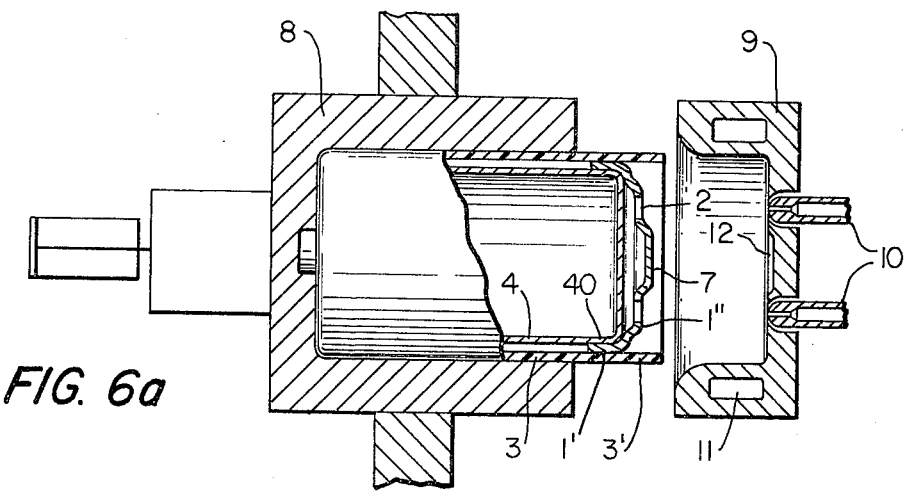
FIGS. 6 a, b, c, show three successive views of the second stage of the method of sealing the bottom of the cell.

FIGS. 6a, b, c, show how the second operational stage of the method according to the invention should be carried out, i.e., sealing the bottom of the cell, involving the injection of plastic material into the dish 1 after fixing the dish to the cup as described previously. FIG. 6a illustrates the method of intruducing the cup 4, complete with its dish 1, into a plastic casing 3, placed in a hollow mobile support 8. The casing 3 is of such length that its lower or outer part 3' extends downwardly from the side-wall 1' of the dish. The length of the extending part 3' should be such as to ensure that this part can be turned back toward but spaced from the bottom of the dish, in FIG. 6b. This length could, however, be made sufficiently large to cover the whole bottom wall of the dish, except for the protrusion 7. In other words, the extending part 3' should have a length more or less equal to the depth of the gap or empty space 7' (see FIG. 2), but it could, of course, be much longer.

To form the bottom of the cell by passing molten plastic material, according to the invention, through the apertures 2, the whole assembly as shown on the left side of FIG. 6a is fed into the mouth of an injection press or mold 9. This press is equipped with injectors 10 and cooling means 11 as is usual and known per se. In the center of press 9 a depression 12 is provided, which matches the shape of the protrusion 7 of the dish, but is shallower to ensure that a small clearance space is left between the ends of the injectors 10 and the apertures 2 when the injection press is operating.

Figure 6B:
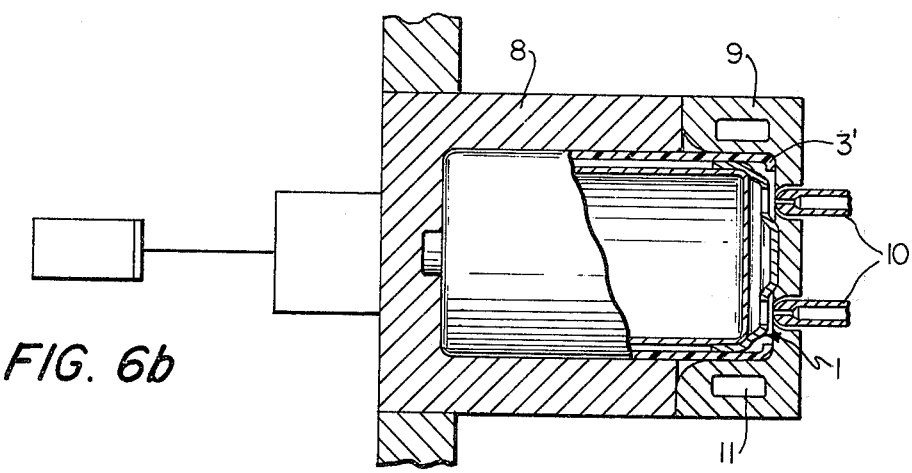

FIG. 6b illustrates the situation at the moment when assembly 8-4-1-3 is fed completely into the mouth of the press 9. It will be noticed that the extending part 3' has been turned inwardly at the peripheral area of the dish 1, and that a small space remains between the injector outlets 10 and the apertures 2, while the bottom of the depression 12 of the injection mouth firmly contacts the protrusion 7 of the dish.

Figure 6C:
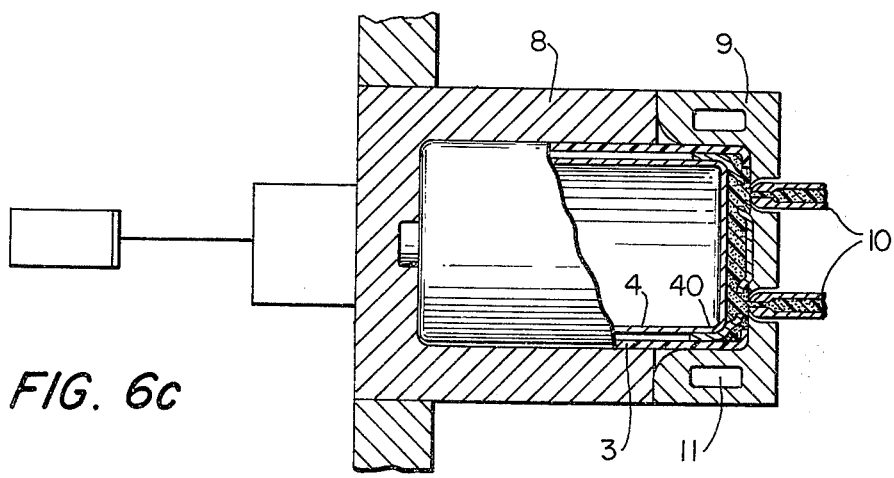

Finally, FIG. 6c illustrates the completion of the operation, i.e., the moment when the plastic material, injected into the space 7' and in the space between the mouth of the press 9 and the outside of the dish 1, has fixed in a single operation the casing 3 to the dish 1. The bottom of the cell has in this way been rendered completely leak-proof. It will be noted that, in the present form of the invention, the passage of the molten plastic material occurs from the outside, i.e., from the injectors 10 positioned outwardly of the dish. Obviously, the action of the coolers 11 will allow very rapid solidification of the molten plastic material, and the resultant bonding of part 3' of the casing 3 to the plastic material.

The description of FIGS. 6a, b, c, shows that the sealing of the bottom is achieved in one single operation, since bonding and welding the part 3' of the plastic casing and the passage of the molten material through the apertures 2 occur almost simultaneously, in the same device during the same action. It is sufficient then to remove the support 8 from the mouth of the injection press 9 in order to remove the completed cell.

In all the foregoing, it is understood that where plastic materials are mentioned and used, they are thermoplastic. Those particularly suitable are polyolefines, such as polyethylenes or polypropylenes, polyamides, and particularly nylon, etc. The injected material should preferably be of the same nature as that which constitutes the casing 3 to ensure perfect bonding of the latter. It is possible, however, to use other materials, provided that they are capable of being securely bonded together. It should be noted that air, forced from the space 7' by the plastic material, may escape into the space between the casing 3 and the side-walls of the cup 4. Part of this air may, however, remain in a small pocket between the bottom 4a of the cup and the dish 1. In one particular constructional variation of the invention, applicable mostly to large-size cells, one or several very small apertures, of the order of one hundredth of a mm, namely from 0.01 to 0.05 mm, are provided in part 7 of the dish to allow the air to escape.

In another constructional form of the invention, the penetration of molten plastic material through the apertures in the dish is directed from the inside of the dish towards the outside. In this case, instead of injecting the molten material, a certain quantity of plastic material is deposited inside the dish prior to fixing the dish to the bottom of the cup, it is then melted and the whole is pressed, in such a way as to make one part of this material pass through the apertures, and to simultaneously bond it to the plastic casing of the cup. This second embodiment is shown in FIGS. 7a and 7b.

Figure 7A:
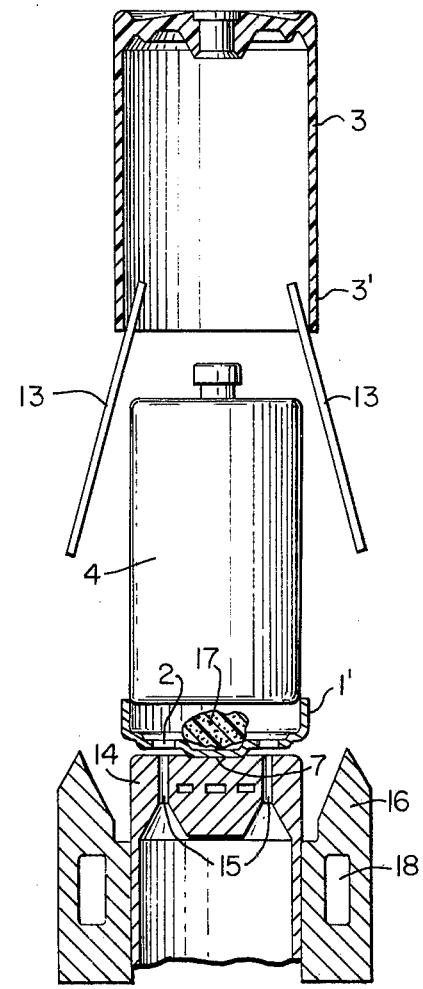
FIGS. 7a and 7b show two successive positions of the cell in the second operational stage, according to a different embodiment of the invention.

FIG. 7a shows the first stage of the single operation which comprises: (1) the introduction of the cup 4 (complete with all its parts forming the cell) into the plastic casing 3, assisted by guides 13, and being pushed from the bottom of the cup by a piston 14 provided with heating means; (2) the melting of the plastic material 17, which was previously introduced into the dish 1. For clarity of the drawing, a support similar to 8, which holds the casing 3, has not been shown.

Figure 7B:
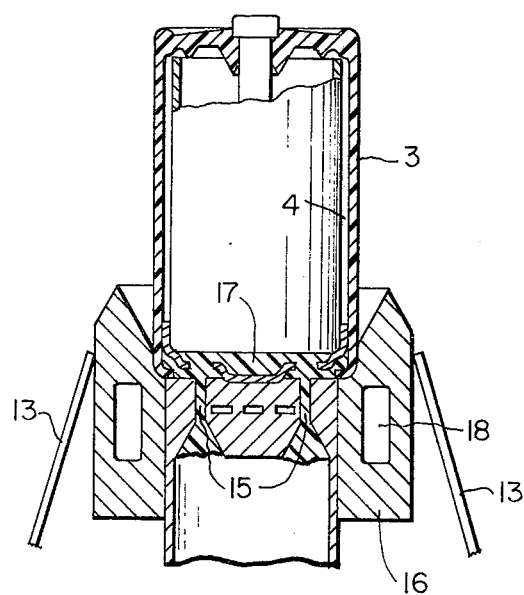

FIG. 7b shows the final stage of this operation. The plastic material 17, which has melted, is passed through the apertures 2, and becomes bonded to the extending part 3' of the plastic casing, while excess plastic material runs out through the outlets 15 provided in the head of the piston 14. Both FIGS. 7a and 7b show the system used for bending over the downwardly extending part 3' of casing 3. This system comprises an annular punch 16 which is also provided with coolers 18 which come into action at the end of the operation.

In the constructional variant shown in FIG. 7a and 7b, it is not necessary for the dish 1 to be fitted in advance onto the bottom of the cup 4, because this operation takes place automatically when the cup is pushed by the piston 14 towards the inside of the casing 3. It could, therefore be said that this constructional solution calls for one single operation for achieving sealing of the cell.

Figure 8A:
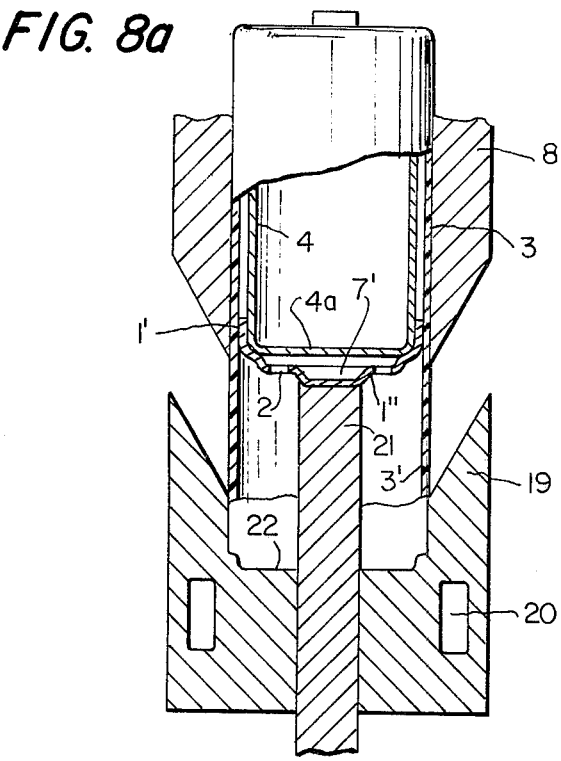
FIGS. 8a and 8b show a third alternative embodiment in the second stage of the operation according to the invention.
Figure 8B:
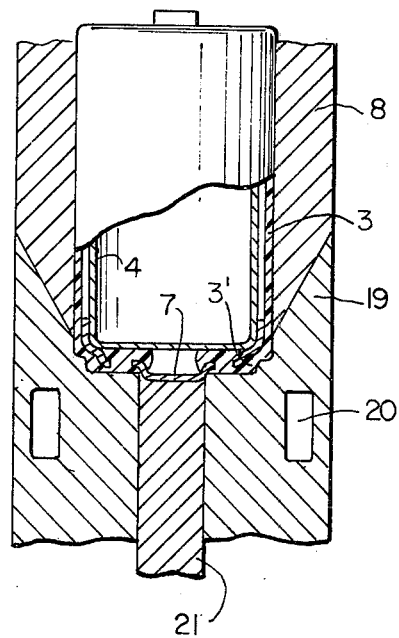

A third embodiment of the sealing according to the invention is illustrated in FIGS. 8a and 8b. In this alternative solution, penetration of plastic material, rendered sufficiently soft, is obtained by using the extending part 3' only of the casing 3, without the use of additional plastic material. For this procedure a casing 3 is used, the extending part 3' of which is at least equal in length to the total width of the peripheral part 1" (see FIG. 1a). This length should preferably exceed the width of 1" and it may be equal approximately to the length of the diameter of the dish. It is in fact necessary for the casing to be sufficiently long to be able to provide a sufficient quantity of the plastic material to ensure that it will pass through the apertures 2 and spread inside the dish.

As can be seen from FIG. 8a, the operation is carried out by means of a punch 19 provided with heating and cooling means 20. Inside the punch slides a rod 21, the head of which matches the shape of the protrusion 7 of the dish 1, but when in contact therewith is spaced from the surface of peripheral part 1". On the other hand, the punch 19 contains a hollow space 22 exhibiting the shape which one wishes to give to the bottom of the cell. The rod 21 fulfils the role of a guide for the punch 19 which compresses and causes the part 3' of the plastic casing to melt. During the compressing action part of the plastic material of this casing flows through the apertures 2 into the interior space 7' of the dish 1. The remainder, of the plastic material of the casing fills the space between the surface 1" and the bottom 22 of the punch. However, the outer surface of the protrusion 7 does not receive any plastic material coating because it is covered and protected by the head of the rod 21.

FIG. 8b shows the final stage of the operation. After cooling, it is sufficient to withdraw the punch 19 and to then remove the correctly sealed cell.

In FIGS. 6 to 8 only the bottom portion of the cup 4 is shown and described, because the invention is concerned with the method of sealing this end of the cell and not of the upper part, i.e., the zone of the positive electrode. It is however to be noted that in each of the constructional solutions shown in FIGS. 6 to 8, the upper part of the cell may be closed by means of the casing 3, at the same time as the operation of sealing the bottom. This closing operation may, as a matter of fact, be carried out in a way which is known (for instance as described in U.S. Pat. Nos. 2,802,042–3,433,681 or 3,501,351) in the part not shown of the support or mould 8, where hot forming or moulding of the casing 3 may be made at the top of the cup 4.

I claim:

1. A method of leak-proof sealing of a dry electrochemical cell, formed by a metallic cup which acts as a negative electrode, in which are positioned an electrolyte, a depolarizer mass and a positive electrode extending beyond one end of the cup, the whole assembly so formed being introduced into a casing of a thermoplastic material which closes the cell at the end thereof with a terminal of said positive electrode, as well as at the opposite end thereof formed by the bottom of the cup, onto which is fixed in electric contact a metallic part which serves as a terminal of said negative electrode, said method comprising:
    a. providing a metallic dish as said metallic part and said terminal of said negative electrode, said dish having a bottom wall perforated with a plurality of apertures in the peripheral area thereof, said bottom wall having an unperforated downwardly extending protrusion positioned centrally of said apertures, said dish having an annular side-wall and a shoulder between said side-wall and said peripheral area, and fitting said dish onto the side-wall of said cup with said shoulder supporting the bottom of said cup and providing a continuous gap between said bottom wall of said dish and said bottom of said cup;
    b. introducing said cup with said dish fitted thereon into said thermoplastic casing, causing said casing to compress said side-wall of said dish fitted onto said cup, to a position wherein the end of said casing extends beyond the bottom of of said cup by a length equal to not less than the distance between said apertures and said bottom of said cup;
    c. axially compressing said dish and said cup and forcing hot thermoplastic material through said apertures in such a way that said hot material blocks said apertures and is present on both sides of said apertures and said bottom wall of said dish, said casing and said hot material being integrally united, while maintaining the outer surface of said unperforated central protrusion of said dish free and not covered by said plastic material; and
    d. cooling said thermoplastic material which is present on both sides of said apertures and joined to said casing until said material solidifies.

2. A method according to claim 1, wherein said step of forcing said material through said apertures comprises injecting a fluid thermoplastic material inwardly through said apertures from an outside source, until the thus injected material is bonded to that part of said casing which extends beyond said bottom of said cup.

3. A method according to claim 2, wherein said injection is carried out by means of a press having an injecting head with a hollow of the same diameter as that of said cup coated with said casing; the bottom of said hollow having therein a cavity corresponding in shape to said protrusion of said dish, the depth of said cavity being less than the height of said protrusion; said injecting head having injection outlets on the surface of the bottom of said hollow peripherally outwardly of said cavity; said injection comprising positioning said cavity against said protrusion of said dish while positioning said cup, coated with said thermoplastic casing, in a support closed by said injecting head.

4. A method according to claim 3, further comprising providing said protrusion of said dish with a perforation 0.01 to 0.05 mm in diameter to allow air to escape therethrough.

5. A method according to claim 1, further comprising, prior to fitting said dish to said cup, placing a quantity of thermoplastic material in said dish, said forcing of said material through said apertures comprising heating said quantity of material and compressing said quantity of material simultaneously with operations (a) and (b).

6. A method according to claim 5, wherein operations (a), (b) and (c) are carried out simultaneously by means of a piston provided with heating means and with outlets for the discharge of said plastic material; said method further comprising moving said piston to push said dish containing said plastic material toward the bottom of said cup, simultaneously pushing said cup inside said casing of thermoplastic material, simultaneously bending inwardly said part of said casing which extends beyond said bottom of said cup by means of a punch which moves outwardly of said piston.

7. A method according to claim 1, wherein said step of forcing said material through said apertures is carried out using the thermoplastic material of said casing itself, the part of which extends beyond said bottom of said cup having a length equal to at least the width of said peripheral area of said dish.

8. A method according to claim 7, wherein said length of said part of said casing which extends beyond said bottom of said cup is approximately between the radius and the diameter of said dish.

9. A method according to claim 8, wherein said step of fitting said dish onto said cup comprises pushing said dish towards said cup by means of a piston, said piston having in the front thereof a cavity of the same shape and dimensions as those of said protrusion of said dish, but less deep than the height of said protrusion, pushing said dish by moving said piston towards a support containing said cup coated with said thermoplastic material, moving a punch inside which said piston moves and and provided with heating and cooling means to close said support, softening the thermoplastic of said part of said casing, bending inwardly said part of said casing, and forcing said thus softened and bent part of said casing through said apertures of the dish.

10. In a dry leak-proof electrochemical cell formed by a metal cup comprising the negative electrode of said cell, said cup having therein an electrolyte, a depolarizer mass and a positive electrode which projects beyond one end of said cup; a metal element electrically contacting the opposite end of said cup and forming a terminal of said negative electrode; the entire assembly thus formed being coated with a thermoplastic casing which encloses said cell with said metal element extending outwardly of said casing:

The improvement wherein: said metal element comprises a dish having a side-wall fixed to and in electrical contact with the side-wall of said cup, adjacent the bottom thereof, said dish having a bottom wall parallel to said bottom of said cup, said bottom wall of said dish having a shoulder which is a continuation of said side-wall thereof abutting said bottom of said cup, said bottom wall having a central protrusion extending outwardly of said casing and forming said terminal of said negative electrode, said bottom wall of said dish having a peripheral area annularly outwardly of said protrusion and having therein a plurality of apertures, there being a continuous gap spacing said peripheral area and said protrusion from said bottom of said cup; and thermoplastic material blocking said apertures and positioned on both sides of said apertures, said thermoplastic material being homogeneously joined to said casing along all the entire periphery thereof.

11. The improvement according to claim 10, wherein the lower part of said cup has the form of a conical frustrum, and said side-wall of said dish flares outwardly to match said conical frustrum.

12. The improvement according to claim 10, wherein the lower part of said cup adjacent to said bottom thereof has a reduced diameter and a protuberant shape, and said side-wall of said dish has the same shape and is in gripping contact with said lower part of said cup.

* * * * *